(12) United States Patent
Chen et al.

(10) Patent No.: US 9,698,890 B1
(45) Date of Patent: Jul. 4, 2017

(54) CYCLIC SHIFT DIVERSITY IN COMMUNICATION SYSTEMS

(71) Applicant: INTEL IP CORPORATION, Santa Clara, CA (US)

(72) Inventors: Xiaogang Chen, Beijing (CN); Qinghua Li, San Ramon, CA (US); Robert Stacey, Portland, OR (US); Hujun Yin, Saratoga, CA (US); Rongzhen Yang, Shanghai (CN)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/998,233

(22) Filed: Dec. 24, 2015

(51) Int. Cl.
*H04B 7/04* (2017.01)
*H04B 7/06* (2006.01)
*H04L 25/03* (2006.01)
*H04B 7/0452* (2017.01)
*H04W 84/12* (2009.01)

(52) U.S. Cl.
CPC ......... *H04B 7/0667* (2013.01); *H04B 7/0452* (2013.01); *H04L 25/03006* (2013.01); *H04W 84/12* (2013.01)

(58) Field of Classification Search
CPC . H04B 7/02; H04B 7/028; H04B 7/04; H04B 7/0404; H04B 7/0408; H04B 7/0413; H04B 7/0628

USPC ......... 375/259, 260, 267, 295, 299
See application file for complete search history.

(56) References Cited

U.S. PATENT DOCUMENTS

| | | | |
|---|---|---|---|
| 2011/0305178 A1* | 12/2011 | Zheng | H04B 7/0671 370/311 |
| 2012/0269183 A1* | 10/2012 | Sohn, III | H04L 1/0025 370/338 |
| 2016/0066321 A1 | 3/2016 | Yu | |
| 2016/0087766 A1* | 3/2016 | Sun | H04L 5/0007 370/329 |
| 2016/0174200 A1* | 6/2016 | Seok | H04W 72/04 370/329 |
| 2016/0227532 A1 | 8/2016 | Azizi et al. | |
| 2016/0249381 A1 | 8/2016 | Choi et al. | |
| 2016/0323848 A1 | 11/2016 | Azizi et al. | |
| 2016/0353480 A1 | 12/2016 | Choi et al. | |

OTHER PUBLICATIONS

Lin Yang, et al.; "11ax CSD Design," IEEE 802.11-16/0618r1; May 16, 2016; 21 pages.

* cited by examiner

*Primary Examiner* — Siu Lee
(74) *Attorney, Agent, or Firm* — Schwabe, Williamson & Wyatt, P.C.

(57) ABSTRACT

Embodiments of the present disclosure describe methods and apparatuses for selective application of cyclic shift diversity in uplink communications of mobile communication systems. Other embodiments may be described and/or claimed.

14 Claims, 8 Drawing Sheets

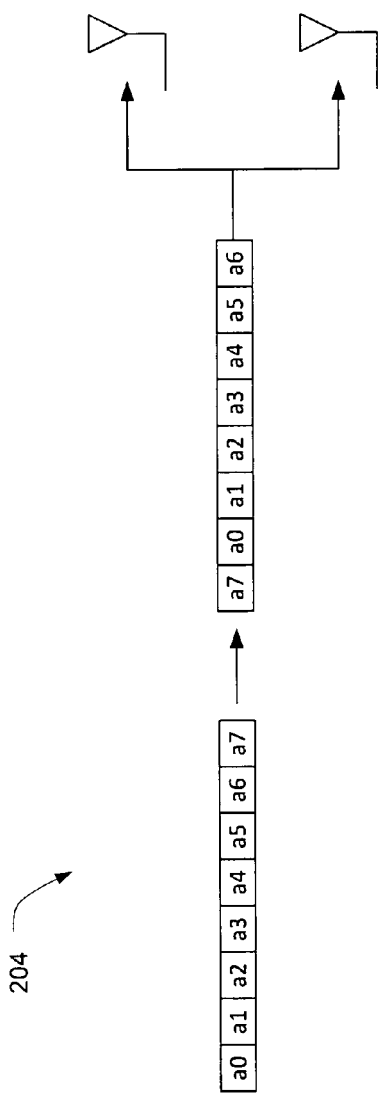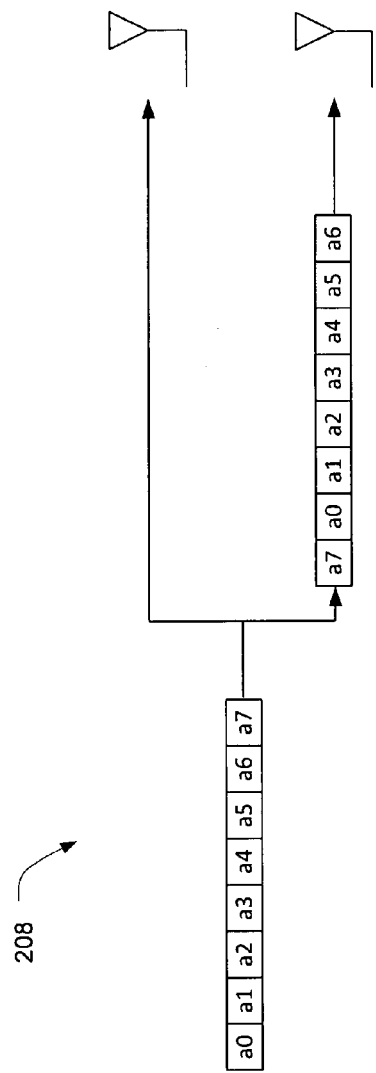

CYCLIC SHIFT DIVERSITY IN COMMUNICATION SYSTEMS

FIELD

Embodiments of the present disclosure generally relate to the field of wireless communication, and more particularly, to apparatuses and methods for cyclic shift diversity in communication systems.

BACKGROUND

To increase diversity and avoid unintended beamforming effects, Institute of Electrical and Electronics Engineers (IEEE) 802.11n/ac uses cyclic shift diversity (CSD) in downlink transmissions. CSD, which may also be referred to as cyclic delay diversity (CDD), may transform spatial diversity into frequency diversity in an effort to avoid intersymbol interference.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 2(a)-2(b) illustrates CSD processes in accordance with some embodiments.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Embodiments of the present disclosure describe the use of different CSD processes on different portions of an uplink communication used in advanced wireless local area network (WLAN) communication systems.

Figure 1:
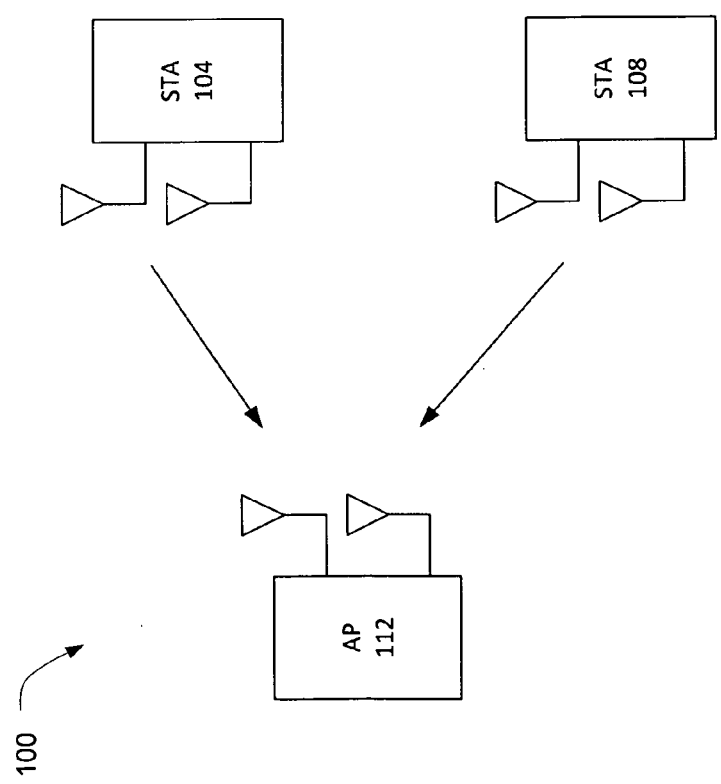
FIG. 1 illustrates a wireless local area network in accordance with some embodiments.

FIG. 1 illustrates a WLAN 100 in accordance with some embodiments. The WLAN 100 may include stations 104 and 108 and an access point (AP) 112. The stations 104 and 108 may gain access to a wired network (not shown) by wirelessly connecting to AP 112 consistent with the IEEE 802.11 standards and protocols.

The stations 104 and 108 may be any electronic device that is capable of creating, receiving, or transmitting information over a wireless communication channel using standards promulgated by the IEEE including the 802.11 standard. Stations 104 and 108 may include user equipment, a computer, a personal computer (PC), a desktop computer, a laptop computer, a notebook computer, a netbook computer, a tablet computer, an ultrabook computer, sensors of any kind and size for any application, wearable computing devices, gaming consoles, a network appliance, a web appliance, a distributed computing system, multiprocessor systems, processor-based systems, or a combination thereof, and the like. Stations 104 and 108 may be fixed or portable. Stations 104 and 108 may include an adapter, card, or other device, embedded or otherwise, to provide wireless connectivity. In the present disclosure, the terms "device," "station," "wireless client," and "node" may be used interchangeably, with no strict distinction existing between these terms.

The AP 112 may be any electronic device that allows a wireless device, e.g., stations 104 and 108, to connect to a wired network using a wireless communications channel under the 802.11 standard. AP 112 may be, for example, a wireless router either standing alone or combined with converged devices that include the AP, router, switch, modem, or the like. AP 112 may function as a bridge between the stations 104 and 108 and an existing wired network for network access.

The AP 112 may communicate wirelessly with stations within a predetermined radius, e.g., 100 meters, although the range of communication can vary significantly depending on indoor or outdoor placing, height above ground, nearby obstructions, other electronic devices that might actively interfere with the signal by broadcasting on the same frequency, type of antenna, current weather, operating radio frequency, and the power of output devices. The AP 112 may encrypt communications with the stations 104 and 108, as is well known to a person of ordinary skill in the art. Similarly, the stations 104 and 108 may encrypt communications with the AP 112 as is well known to a person of ordinary skill in the art.

In some embodiments, the stations 104 and 108 may communicate with the AP 112 using uplink (UL) multi-user multiple input multiple output (MU-MIMO). The stations 104 and 108 may use the same uplink resources (for example, time and frequency) to send respective UL transmissions. The AP 112 may distinguish the transmissions from one another based on, for example, the use of different signatures by the different stations 104 and 108.

In some embodiments, the stations 104 and 108 may communicate with the AP 112 using orthogonal frequency division multiple access (OFDMA) communications in the uplink or downlink.

In some embodiments, the stations 104 and 108 may utilize various CSD processes in their uplink transmissions. The CSD may be across antennas of the same data stream, which may be referred to as a per-antenna CSD process; or the CSD may be across different data streams, which may be referred to as a per-stream CSD process.

FIG. 2 illustrates CSD processes in accordance with some embodiments. In particular, FIG. 2(*a*) illustrates a per-stream CSD process 204 and FIG. 2(*b*) illustrates a per-antenna CSD process 208 in accordance with some embodiments.

In the per-stream CSD process 204, CSD may be provided to a stream of data including eight segments, for example, a0-a7, by providing a cyclic shift having a value equal to one segment to move the last segment, a7, from the end of the stream to the beginning. The same shifted stream of data may then be transmitted over multiple antennas. The diversity provided in this context may derive from other streams, either transmitted by the same station (on one or more other antennas) or a different station, using other cyclic shift values (including a zero value) to provide other sequences. For example, while the shifted data stream (a7, a0, a1, a2, a3, a4, a5, a6) may be transmitted as a first stream, a second stream having a different shift, for example, no shift (a0, a1, a2, a3, a4, a5, a6, a7), may be transmitted as a second stream. This may be especially useful in MU-MIMO transmissions in which a same signal, or part thereof, may be transmitted by more than one station.

In the per-antenna CSD process 208, the stream of data may be split between a first path that is to be provided to a first antenna and a second path that is to be provided to a second antenna. A cyclic shift may be provided with respect to only one of the paths, the bottom path shown in FIG. 2(*b*), thereby providing CSD between the different paths.

It will be understood that more complicated versions of the CSD processes 204 and 208 may be implemented, in both the frequency and time domain, consistent with this general description.

Figure 3:
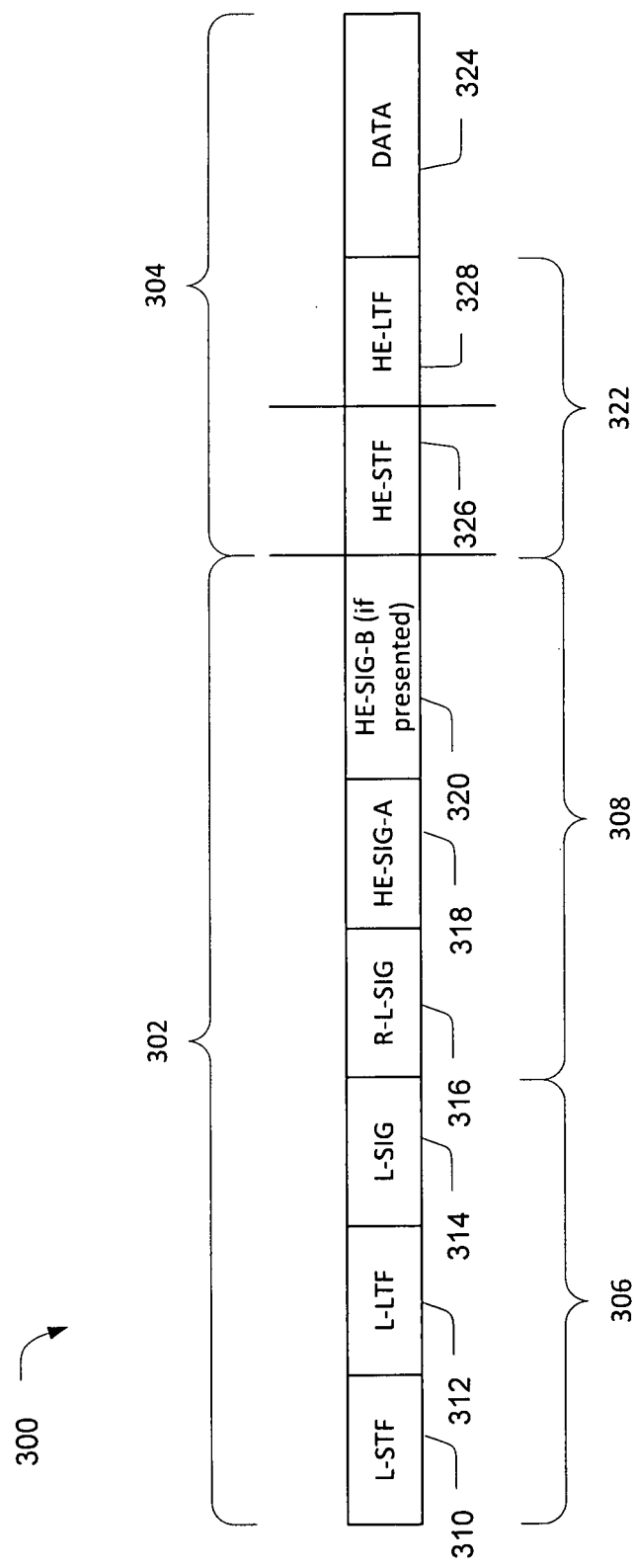
FIG. 3 illustrates an uplink packet format in accordance with some embodiments.

FIG. 3 illustrates an uplink packet format 300 in accordance with some embodiments. The uplink packet format 300, which may also be referred to as a physical protocol data unit (PPDU), may include a first portion 302 and a second portion 304. The first portion 302 and the second portion 304 may each include a number of fields, with the individual fields including bit sequences representing, for example, one or more OFDMA symbols. The uplink packet format 300 may be a format used by stations 104 or 108 to transmit uplink signals to the AP 112. In some embodiments, the uplink packet format 300 may be used by devices compatible with 802.11 amendments including, but not limited to, 802.11ax and later amendments.

The first portion 302 may include a legacy preamble 306 and a high-efficiency preamble 308. The legacy preamble 306 may be duplicated on each 30 MHz for backward compatibility with legacy devices. The legacy preamble 306 may include a legacy-short training field (L-STF) 310, a legacy-long training field (L-LTF) 312, and a legacy-signal field (L-SIG) 314. In some embodiments, the L-STF 310 and the L-LTF 312 may be 8 µs, and the L-SIG 314 may be 4 µs, and the R-L-SIG 316 may be 4 µs. The fields of the legacy preamble 306 may be defined consistent with 802.11 a, b, g, or n. The high-efficiency preamble 308 may include a repeated L-SIG field (R-L-SIG) 316, which may be a 4 µs symbol repeating the content of the L-SIG 316 to assist in a receiver's early identification of an UL signal as being compatible with 802.11ax. The high-efficiency preamble 308 may further include a high-efficiency signal A field (HE-SIG-A) 318 and a high-efficiency signal B field (HE-SIG-B) (if presented) 320. The HE-SIG-A 318 may use a discrete Fourier transform (DFT) period of 3.2 us and a subcarrier spacing of 312.5 kHz and may be duplicated on each 30 MHz to indicate common control information. The high-efficiency preamble 308 may also be referred to as a single stream efficiency preamble 308 as the same content may be sent from more than one station.

The second portion 304 may also include a high-efficiency preamble 322 and a data field (DATA) 324. The high-efficiency preamble 322 may include a high-efficiency short training field (HE-STF) 326 and a high-efficiency long training field (HE-LTF) 328. The HE-STF 326 may include one or more symbols that are used by the AP 112 to adjust an automatic gain control (AGC). The HE-LTF 328 may include one or more symbols that are used by the AP 112 to provide an initial carrier frequency offset (CFO) estimation. Data symbols in DATA 324 may use a DFT period of 1220 µs, a subcarrier spacing of 78.125 kHz, and may support guard interval durations of 0.8 µs, 1.6 µs, and 3.2 µs.

In some embodiments, the stations 104 or 108 may use a per-stream CSD processes to transmit the first portion 302. And if more than one antenna is configured in the station, the station may use a per-antenna CSD process on top of the per-stream CSD process.

In some embodiments, the stations 104 or 108 may use a per-stream CSD process in the transmission of the symbols of the HE-STF 326. In providing the per-stream CSD process to the symbols of the HE-STF 326, the stations 104 or 108 may use large cyclic shift values (relative to, for example, a cyclic shift value used to shift symbols in the DATA 324 or the first portion 302). The relatively large cyclic shift value may increase orthogonality between HE-STFs transmitted from different stations. This may facilitate AGC setting by the AP 112.

If the stations 104 or 108 are transmitting the data stream on more than one antenna, a per-antenna CSD process may be used on top of the per-stream CSD process in the transmission of the symbols of the HE-STF 326.

In order to enable initial CFO estimation using the LTF sequence in the HE-LTF 328, stations 104 or 108 may send orthogonal LTF sequences across frequency. If a large cyclic shift value were to be applied among the stations, a large linear phase shift would be added to the channel responses across frequency. This may prevent the channel responses of adjacent subcarriers from remaining roughly constant. The received LTF sequences from the different stations over the adjacent subcarriers may no longer be orthogonal with each other. This may compromise the estimation of the initial CFO by the AP 112.

In order to maintain orthogonality of the LTF sequences, embodiments may not use any CSD process on the HE-LTF 328. After processing the LTF sequences, the receiver at the AP 112 may obtain channel estimates without CSD as described in further detail below. With this approach, orthogonality of the LTF sequence may be maintained.

In some embodiments, a CSD process may be applied to the DATA 324 in order to increase diversity and decouple communications from different stations. The stations 104 or 108 may use small cyclic shift values (relative to, for example, a cyclic shift value used to shift and HE-STF sequence). In some embodiments, as described below, the CSD process may not be used with the DATA 324.

Figure 4:
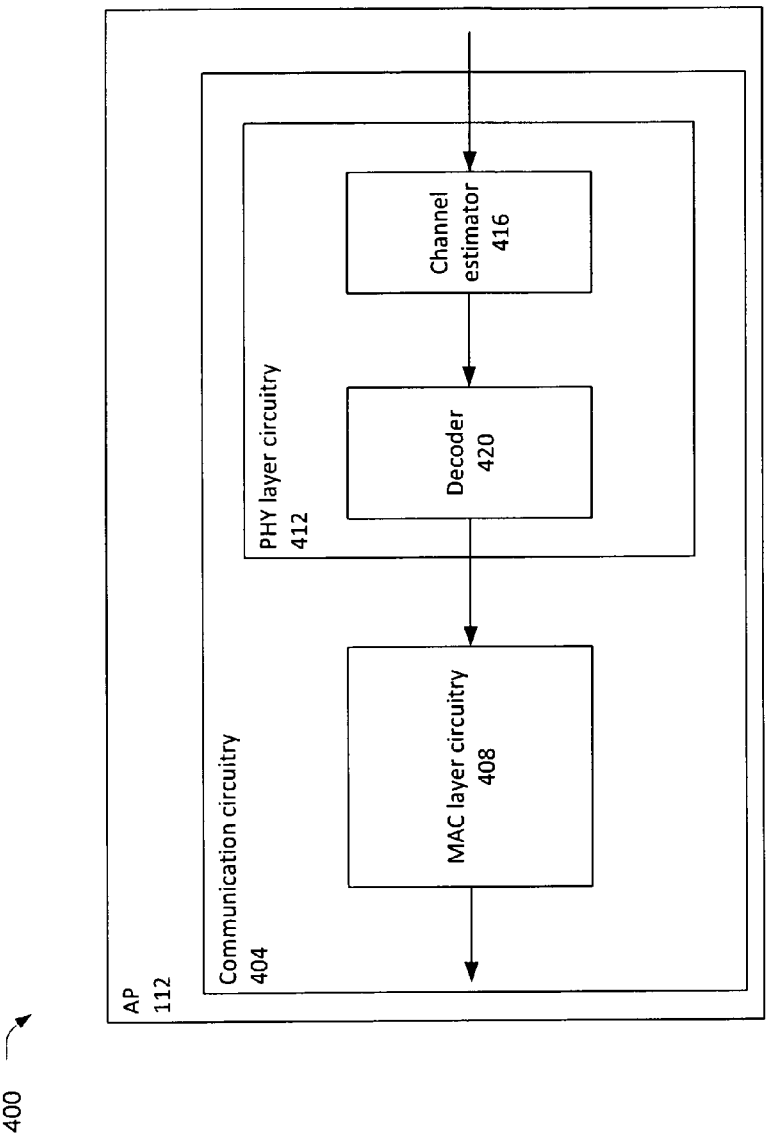
FIG. 4 illustrates an access point in accordance with some embodiments.

FIG. 4 illustrates the AP 112 in further detail in accordance with some embodiments. In particular, FIG. 4 illustrates communication circuitry 404 having components to process WLAN communications. The communication circuitry 404 may include media access control (MAC) layer circuitry 408 coupled with physical (PHY) layer circuitry 412. Description of the MAC layer circuitry 408 and the PHY layer circuitry 412 (and the communication circuitry 404 in general) is restricted to receiver components that provide receive operations relevant to the embodiments of the present disclosure. It will be understood that the communication circuitry 404 may include additional components to provide a variety of functions to facilitate WLAN communication.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some, the electronic device circuitry may be implemented in, or functions associated with the circuitry may be implemented by, one or more software or firmware modules.

Generally, the PHY layer circuitry 412 may include a variety of radio-frequency, mixed signal, and analog portions that are often called transceivers, and a digital baseband portion that uses processors (e.g., digital signal processors (DSPs)) to provide communication algorithm processing, including channel codes. The PHY circuitry 412 may process a signal received over the air to provide a PPDU, for example, uplink signal format 300. The PHY layer circuitry 412 may extract a physical layer service data unit (PSDU) from the PPDU and provide the PSDU to the MAC layer circuitry 408. The MAC layer circuitry 408 may be configured to provide various addressing and channel access control mechanisms. The MAC layer circuitry 408 may process the PSDU, which may also be referred to as a MAC layer PDU (MPDU) to perform various addressing and channel access control operations. The MAC layer circuitry 408 may provide a MAC layer service data unit (MSDU) to an upper layer, for example, a data link layer.

Of particular relevance to the embodiments of the present disclosure, the PHY layer circuitry 412 may include a channel estimator 416 coupled with a decoder 420. The channel estimator 416 and decoder 420 may be disposed in the digital baseband portion of the PHY layer circuitry 412. Briefly, the channel estimator 416 may receive a signal from a transceiver portion after the transceiver portion provides various front end operations such as, but not limited to, analog-to-digital conversion, cyclic prefix deletion, discrete Fourier transform to transform the time domain signal into the frequency domain, and guard band deletion. The channel estimator 416 may then attempt to construct an estimate of the channel over which the signal was transmitted by using pilot tones inserted into one or more subcarriers of the signal. The estimation may be based on least square (LS), minimum mean-square error (MMSE), or modified MMSE.

The decoder 420 may receive an estimate of the channel and the received signal from the channel estimator 416 and use the estimated channel to decode the signal to recover binary data that may then be provided to the MAC layer circuitry 408 for higher-layer processing. As used herein, decoding may include various signal deconstruction operations based on channel coding, error correction coding, demodulating, etc.

In some embodiments, the channel estimator 416 may estimate a channel response based on the HE-LTF sequence in the HE-LTF 328. However, as discussed above, a CSD process may be used for the data sequence, but not the HE-LTF sequence in some embodiments. Therefore, in these embodiments the equivalent channel for decoding the data may be the original channel (measured on the HE-LTF sequence) multiplied by a linear phase shift. For example, the channel responses for stream k estimated from HE-LTF symbol(s) are denoted by $[h_1(k)\ h_2(k)\ \ldots\ h_N(k)]$ and the CSD phase shifts for the stream are denoted by $[e^{j\Theta_1(k)} e^{j\Theta_2(k)} \ldots e^{j\Theta_N(k)}]$. Then, the channel estimates used to decode the subsequent symbols of the data sequence may be $[h_1(k)e^{j\Theta_1(k)} h_2(k)e^{j\Theta_2(k)} \ldots h_N(k)e^{j\Theta_N(k)}]$. Thus, even though the station may use a per-stream CSD for the data sequence, but not the HE-LTF sequence, the AP 112 may synthesize the channel responses for the data sequence by adding the CSD phase shifts to the channels estimated from the HE-LTF sequence. Since the AP 112 assigned the CSD values to streams or stations at the beginning of an UL MIMO, the AP 112 may know the CSD shifts of each stream.

Figure 5:
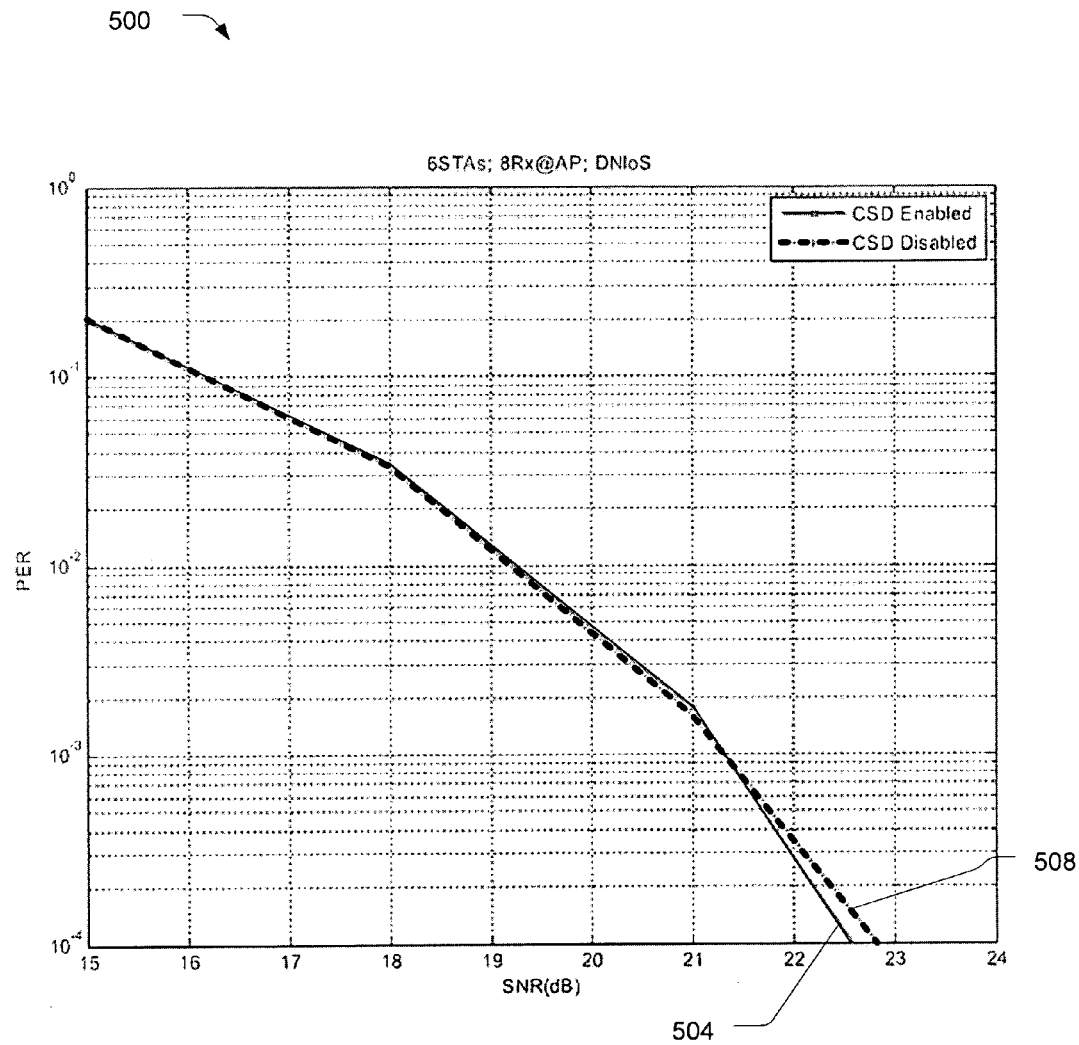
FIG. 5 illustrates a graph depicting a performance comparison for different CSD assumptions in accordance with some embodiments.

For uplink transmissions, the stations 104 and 108 may be located in different positions. This may potentially degrade channel correlation from the stations 104 and 108. Applying an additional CSD on top of a low-correlated channel, may not provide significant gain. FIG. 5 illustrates a graph 500 depicting a performance comparison for different CSD assumptions in accordance with some embodiments. The graph 500 shows a first line 504 representing operation with CSD enabled on a data sequence and a second line 508 representing operation with CSD disabled on a data sequence. As can be seen, both lines 504 and 508 have virtually the same performance, in terms of packet error rate (PER), for a signal-to-noise ratio (SNR) range of approximately 15 to 21.5 dB and only a slight variation for an SNR range of approximately 21.5 to 22.5. Thus, in some embodiments the PHY layer circuitry may not use any CSD process on the data sequence. This may result in both the HE-LTF and data sequences not using a CSD process. In this case, the channel response estimated on the HE-LTF, $[h_1(k)\ h_2(k)\ \ldots\ h_N(k)]$, may be directly applied for the decoding of the data sequence.

Figure 6:
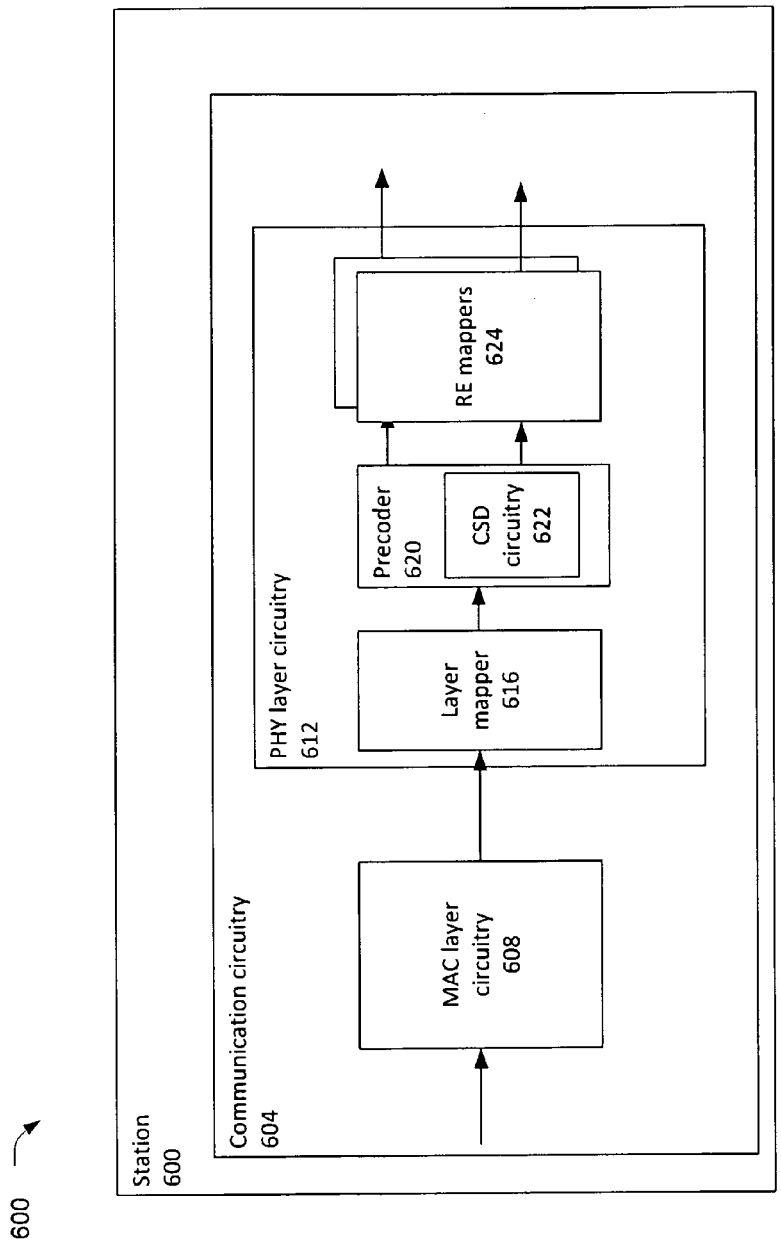
FIG. 6 illustrates a station in accordance with some embodiments.

FIG. 6 includes a station 600 in accordance with some embodiments. In particular, FIG. 6 illustrates communication circuitry 604 having components to process WLAN communications. The station 600 may be similar to, and substantially interchangeable with, stations 104 or 108.

The communication circuitry 604 may include MAC layer circuitry 608 coupled with PHY layer circuitry 612. Description of the MAC layer circuitry 608 and the PHY layer circuitry 612 (and the communication circuitry 604, in general) is restricted to transmitter components that provide transmit operations relevant to the embodiments of the present disclosure. It will be understood that the communication circuitry 604 may include additional components to provide a variety of functions to facilitate WLAN communications.

The MAC layer circuitry 608 and the PHY layer circuitry 612 may be similar to like-named elements of FIG. 4. In the downlink direction, the MAC layer circuitry 608 may receive an MSDU from upper layers such as, for example, a data link layer and generate an MPDU that is provided to the PHY layer circuitry 612. The PHY layer circuitry 612 may process the MPDU into a PPDU that may be transmitted over the air interface.

Of particular relevance to the embodiments of the present disclosure, the PHY layer circuitry 612 may include a layer mapper 616, a precoder 620 that includes CSD circuitry 622, and resource element (RE) mappers 624. The layer mapper 616 may receive signal information from the MAC layer circuitry 608. The signal information may be processed through one or more other components of the PHY layer circuitry 612 to provide complex-value modulation symbols (including, for example, HE-STF symbols, HE-LTF symbols, and data symbols), which the layer mapper 616 may map onto one or more transmission layers (or data streams).

The precoder 620 may precode the layered modulation symbols for transmission. The precoder 620 may include, for example, a zero-forcing operation. The precoder 620 may encode the layered complex-valued modulation symbols on each layer for transmission on respective antenna ports through respective RE mappers 624. Precoding may be used to convert the antenna domain signal processing into the beam-domain processing, that is, for beam-forming. The precoding performed by the precoder 620 may be chosen from a set of precoding matrices, called a codebook, that is known to both a receiver and a transmitter.

The precoder 620 may also include the CSD circuitry 622 to provide CSD operations as described herein. For example, the CSD circuitry 622 may receive the modulation symbols in a PPDU having, for example, an uplink packet format 300. The CSD circuitry 622 may then selectively apply one or more CSI processes to the PPDU. For example, in one embodiment, the CSD circuitry 622 may use a CSI process on the HE-STF sequence of the PPDU but not on the HE-LTF sequence of the PPDU. In some embodiments, the precoder 620 may refrain from applying or using CSD on the HE-LTF sequence by, for example, not providing the HE-LTF sequence to the CSD circuitry 622. The CSD circuitry 622 may or may not use a CSD process on the data field sequence of the PPDU.

The RE mappers 624 may receive the precoded stream (or streams) and map it (or them) to resource elements for transmission on one or more antenna ports.

Figure 7:
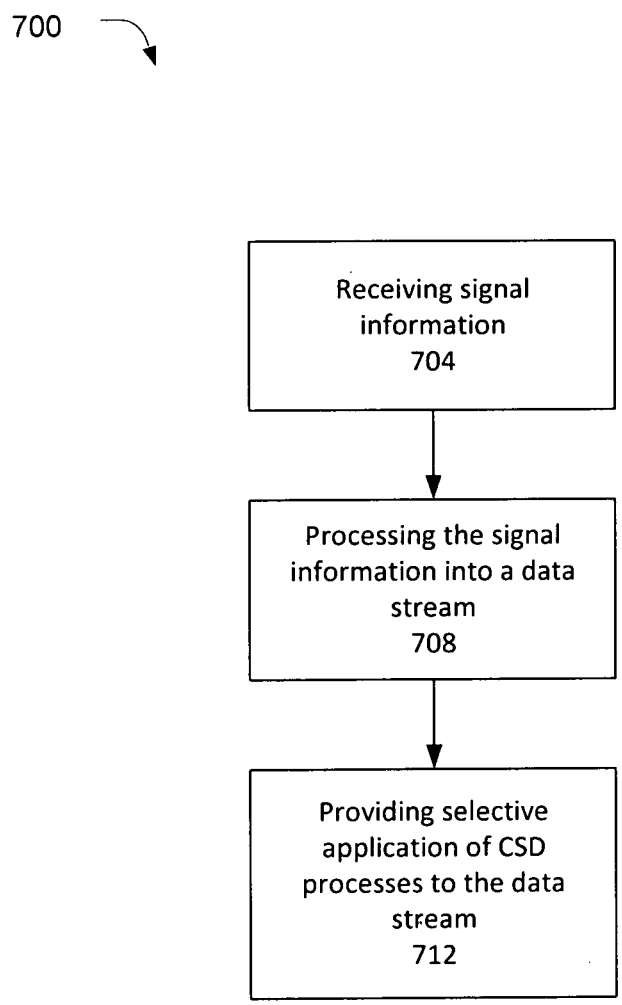
FIG. 7 is a flowchart illustrating an uplink operation of a station in accordance with some embodiments.

FIG. 7 is a flowchart illustrating an uplink operation of a station in accordance with some embodiments. The uplink operation 700 may be done by stations 104, 108, or 600 in accordance with various embodiments. In some embodiments, the uplink operation 700 may be performed by components of PHY layer circuitry 612 such as CSD circuitry 622.

The uplink operation 700 may include, at 704, receiving signaling information. In some embodiments, the signaling information may be an MPDU provided to PHY layer circuitry from the MAC layer circuitry. The signaling information may also be considered as the information post initial processing by the PHY layer circuitry as received by one or more components of the PHY layer circuitry.

The uplink operation 700 may further include, at 708, processing the signal information into a data stream. In particular, the signal information may be processed into a data stream that includes modulation symbols arranged in a PPDU in, for example, a format consistent with uplink packet format 300. The processed data stream may include one or more symbols of an HE-STF sequence, an HE-LTF sequence, and a data field sequence.

The uplink operation 700 may further include, at 712, providing selective application of CSD processes to the data stream. Providing selective application of the CSD process may facilitate provision of desired orthogonality for both the HE-STF and the HE-LTF sequences. In some embodiments, the utilization of the CSD process may be performed by CSD circuitry 622 as a subcomponent of a pre-coding operation. In other embodiments, the CSD process may be performed at other stages in the transmit operations.

In some embodiments, the selective application of CSD processes may include using a CSD process on the HE-STF sequence but not on the HE-LTF sequence of the data stream. This may facilitate provision of desired orthogonality for both the HE-STF and the HE-LTF sequences. In some embodiments, selective application of CSD processes may include using a CSD process on the data. In other embodiments, selective application of CSD processes may include not using any CSD process on the data.

Figure 8:
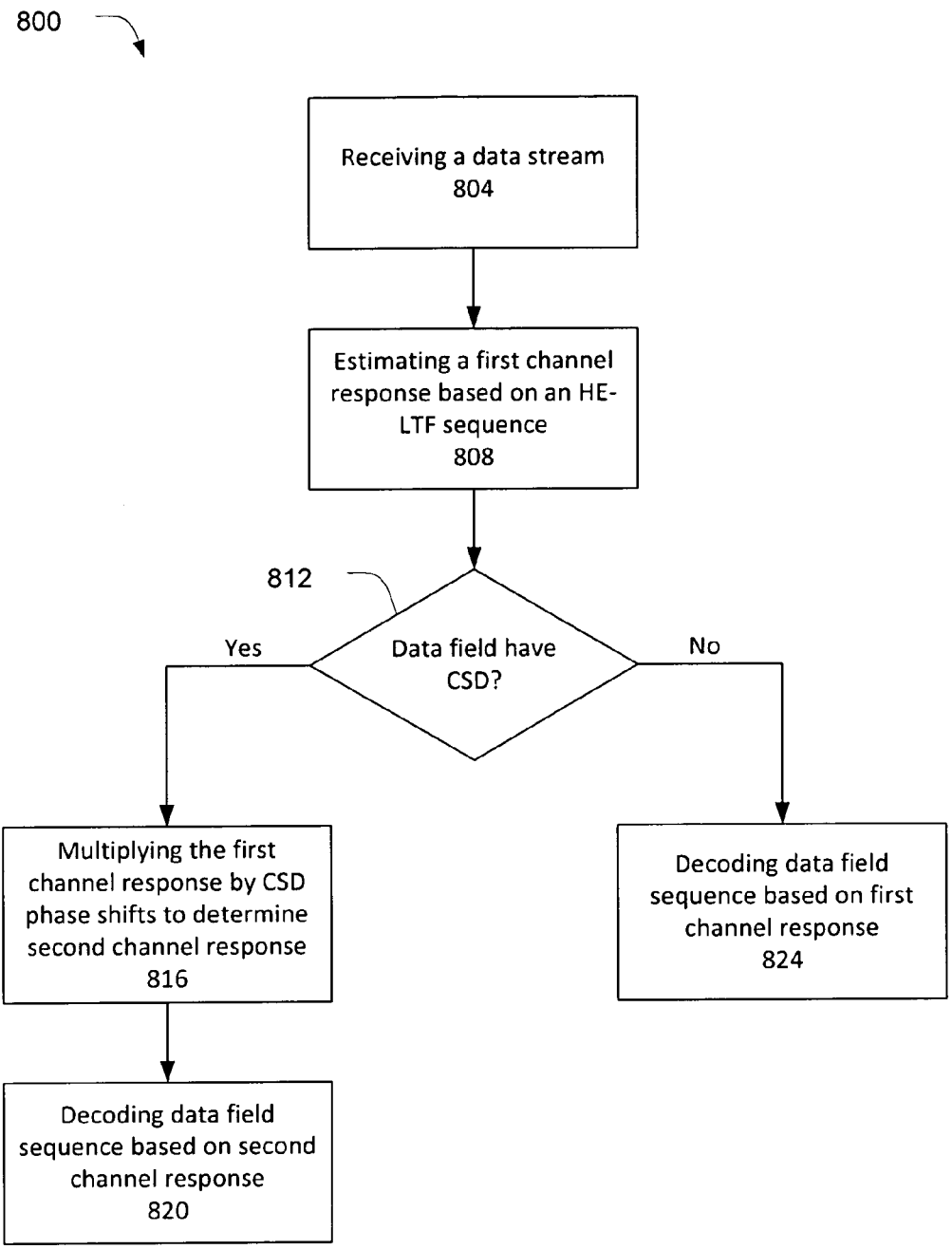
FIG. 8 is a flowchart illustrating a decoding operation of an access point in accordance with some embodiments.

FIG. 8 is a flowchart illustrating a decoding operation 800 of an access point in accordance with some embodiments. The decoding operation 800 may be done by AP 112 in accordance with various embodiments. In some embodiments, the decoding operation 800 may be performed by components of PHY layer circuitry 412 such as, for example, channel estimator 416 and decoder 420.

The decoding operation 800 may include, at 804, receiving a data stream. The data stream may be received by the channel estimator 416 from other components included in the PHY layer circuitry or, for example, from an RF front end. The data stream may include one or more symbols of an HE-STF sequence, an HE-LTF sequence, and a data field sequence.

The decoding operation 800 may include, at 808, estimating a first channel response based on an HE-LTF sequence.

The decoding operation 800 may include, at 812, determining whether CSD was used on the data field sequence. As discussed above, in some embodiments, CSD may or may not be used with the data field sequence. Whether CSD is to be used on the data sequence may be originally determined by the AP, which may then instruct the stations during an MU-MIMO initialization.

If, at 812, it is determined that CSD was used on the data field, the AP may determine that the first channel response is insufficient to use as CSD was used for the data but not the HE-LTF sequence and the decoding operation 800 may advance to 816. At 816, the decoding operation 800 may include multiplying the first channel response by CSD phase shifts to determine a second channel response.

Following 816, the decoding operation 800 may include, at 820, decoding the data field sequence based on the second channel response.

If, at 812, it is determined that CSD was not used on the data field, the AP may determine that the first channel response is sufficient as CSD was not used for either the data or the HE-LTF sequences and the decoding operation 800 may advance to 824. At 824, the decoding operation 800 may include decoding the data field sequence based on the first channel response.

Some non-limiting examples are described below.

Example 1 includes an apparatus comprising: media access control (MAC) layer circuitry to provide signal information; and physical (PHY) layer circuitry coupled with the MAC layer circuitry to: receive the signal information from the MAC layer circuitry; process the signal information into a data stream to be transmitted by one or more antennas of a user equipment, the data stream to include a preamble with a high-efficiency short training field (HE-STF) sequence and a high-efficiency long training field (HE-LTF) sequence; use a cyclic-shift diversity (CSD) process on the HE-STF sequence but not on the HE-LTF sequence; and cause the data stream to be transmitted by one or more antennas of a user equipment.

Example 2 includes the apparatus of example 1, wherein the CSD process is a per-stream CSD process.

Example 3 includes the apparatus of example 2, wherein the PHY layer circuitry is to shift the HE-STF sequence by a first CSD value, the first CSD value larger than a second CSD value used to shift a data field sequence of the data stream.

Example 4 includes the apparatus of example 2 or 3, wherein the data stream is to be transmitted by a plurality of antennas and the PHY layer circuitry is further to use a per-antenna CSD process on the HE-STF sequence.

Example 5 includes the apparatus of any one of examples 1-4, wherein the preamble is a first high-efficiency preamble and the data stream further includes a second high-efficiency preamble, the CSD process is a first CSD process that uses a first cyclic shift value; and the PHY layer circuitry is further to: use a second CSD process on the second high-efficiency preamble, the second CSD process to use a second cyclic shift value that is smaller than the first cyclic shift value.

Example 6 includes the apparatus of any one of examples 1-5, wherein the CSD process is a first CSD process and the PHY layer circuitry is to use a second CSD process on a data sequence of the data stream.

Example 7 includes the apparatus of any one of examples 1-6, wherein the PHY layer circuitry does not use any CSD process on a data sequence of the data stream.

Example 8 includes an apparatus comprising: a layer mapper to map modulation symbols on to one or more transmission layers, the modulation symbols to include one or more high-efficiency short training field (HE-STF) symbols and one or more high-efficiency long training field (HE-LTF) symbols; a precoder coupled with the layer mapper to receive the modulation symbols on the one or more transmission layers and to precode the modulation symbols to provide precoded modulation symbols, the precoder to include cyclic shift diversity (CSD) circuitry to apply a CSD process to the HE-STF symbols and to refrain from applying CSD to the HE-LTF symbols; and one or more resource element (RE) mappers to receive the precoded modulation symbols and to map the precoded modulation symbols to resource elements for transmission via one or more antenna ports.

Example 9 includes the apparatus of example 8, wherein the CSD process is a per-stream CSD process.

Example 10 includes the apparatus of example 9, wherein the CSD circuitry is to shift the HE-STF sequence by a first CSD value, the first CSD value larger than a second CSD value used to shift a data field sequence of the data stream.

Example 11 includes the apparatus of example 9 or 10, wherein the layer mapper is to map the modulation symbols onto one transmission layer that is to be transmitted by a plurality of antennas and the CSD circuitry is further to use a per-antenna CSD process on the HE-STF symbols.

Example 12 includes the apparatus of any one of examples 8-11, wherein the HE-STF symbols are in a first high-efficiency preamble; the CSD process is a first CSD process that uses a first cyclic shift value; and the CSD circuitry is further to: use a second CSD process on a second high-efficiency preamble, the second CSD process to use a second cyclic shift value that is smaller than the first cyclic shift value.

Example 13 includes the apparatus of example 12, wherein the apparatus is to receive the first and second cyclic shift values from an access point.

Example 14 includes the apparatus of any one of examples 8-13, wherein the CSD process is a first CSD process and the CSD circuitry is to use a second CSD process on data symbols of the modulation symbols.

Example 15 includes the apparatus of any one of examples 8-14, wherein the CSD circuitry does not use any CSD process on data symbols of the modulation symbols.

Example 16 includes the apparatus of any one of examples 8-15, wherein the apparatus is to communicate with an access point using multiple-user multiple input multiple output (MIMO).

Example 17 includes an apparatus comprising: a channel estimator to: receive a data stream that includes a high-efficiency long training field (HE-LTF) sequence and a data field sequence; estimate a first channel response for the data stream based on the HE-LTF sequence; and multiply the first channel response by a linear phase shift associated with the data field sequence to determine a second channel response; and a decoder to decode the data field sequence based on the second channel response.

Example 18 includes the apparatus of example 17, wherein the HE-LTF sequence is transmitted without CSD.

Example 19 includes the apparatus of example 18, wherein the data field sequence is transmitted with CSD.

Example 20 includes the apparatus of any one of examples 17-19, wherein the linear phase shift includes cyclic shift diversity (CSD) phase shifts.

Example 21 includes the apparatus of anyone of example 17-20, wherein the apparatus is implemented with an access point that is in communication with a plurality of stations using multiple-user multiple input multiple output (MIMO).

Example 22 includes a station comprising: one or more antennas; and communication circuitry that includes cyclic shift diversity (CSD) circuitry to use a CSD process on a high-efficiency short training field (HE-STF) sequence but not on a high-efficiency long training field (HE-LTF) of a data stream, the communication circuitry to cause the data stream to be transmitted by the one or more antennas.

Example 23 includes the station of example 22, wherein the CSD process is a per-stream CSD process.

Example 24 includes the station of example 23, wherein the CSD circuitry is to shift the HE-STF sequence by a first CSD value, the first CSD value larger than a second CSD value used to shift a data field sequence of the data stream.

Example 25 includes the station of any one of examples 23-24, wherein the data stream is to be transmitted by a plurality of antennas and the PHY layer circuitry is further to use a per-antenna CSD process on the HE-STF sequence.

Example 26 includes the station of any one of examples 22-25, wherein the HE-STF and of the HE-LTF is in a first high-efficiency preamble and the data stream further includes a second high-efficiency preamble, the CSD process is a first CSD process that uses a first cyclic shift value; and the CSD circuitry is further to: use a second CSD process on the second high-efficiency preamble, the second CSD process to use a second cyclic shift value that is smaller than the first cyclic shift value.

Example 27 includes the station of any one of examples 22-26, wherein the CSD process is a first CSD process and the PHY layer circuitry is to use a second CSD process on a data sequence of the data stream.

Example 28 includes the station of any one of examples 22-26, wherein the CSD circuitry does not use any CSD process on a data sequence of the data stream.

Example 29 includes an access point comprising: one or more antennas; and communication circuitry to: receive a data stream, by the one or more antennas, that includes high efficiency long training field (HE-LTF) sequence and data field sequence; estimate a first channel response for the data stream based on the HE-LTF sequence; multiply the first channel response by a linear phase shift associated with the data field sequence to determine a second channel response; and decode the data field sequence based on the second channel response.

Example 30 includes the access point of example 29, wherein the HE-LTF sequence is transmitted without CSD.

Example 31 includes the access point of example 29 or 30, wherein the data field sequence is transmitted with CSD.

Example 32 includes the access point of any one of examples 29-31, wherein the linear phase shift includes cyclic shift diversity (CSD) phase shifts.

Example 33 includes the access point of any one of examples 29-32, wherein the apparatus is implemented with an access point that is in communication with a plurality of stations using multiple-user multiple input multiple output (MIMO).

Example 34 includes a method comprising: receiving signal information; processing the signal information into a data stream to be transmitted by one or more antennas of a user equipment, the data stream to include a preamble with a high-efficiency short training field (HE-STF) sequence and a high-efficiency long training field (HE-LTF) sequence; using a cyclic-shift diversity (CSD) process on the HE-STF sequence but not on the HE-LTF sequence; and causing the data stream to be transmitted by one or more antennas of a user equipment.

Example 35 includes the method of example 34, wherein the CSD process is a per-stream CSD process.

Example 36 includes the method of example 35, wherein using the CSD process includes: shifting the HE-STF sequence by a first CSD value, the first CSD value larger than a second CSD value used to shift a data field sequence of the data stream.

Example 37 includes the method of example 35, further comprising: transmitting the data stream by a plurality of antennas; and using a per-antenna CSD process on the HE-STF sequence.

Example 38 includes the method of any one of examples 34-37, wherein the preamble is a first high-efficiency preamble and the data stream further includes a second high-efficiency preamble, the CSD process is a first CSD process that uses a first cyclic shift value; and the method further comprises: using a second CSD process on the second high-efficiency preamble, the second CSD process to use a second cyclic shift value that is smaller than the first cyclic shift value.

Example 39 includes the method of any one of examples 34-38, wherein the CSD process is a first CSD process and the method further comprises using a second CSD process on a data sequence of the data stream.

Example 40 includes the method of any one of examples 34-38, wherein no CSD process is used on a data sequence of the data stream.

Example 41 includes a method comprising: mapping modulation symbols on to one or more transmission layers, the modulation symbols to include one or more high-efficiency short training field (HE-STF) symbols and one or more high-efficiency long training field (HE-LTF) symbols; pre-coding the modulation symbols to provide precoded modulation symbols, the pre-coding to include applying a cyclic shift diversity (CSD) process to the HE-STF symbols and refraining from applying CSD to the HE-LTF symbols; and mapping the precoded modulation symbols to resource elements for transmission via one or more antenna ports.

Example 42 includes the method of example 41, wherein the CSD process is a per-stream CSD process.

Example 43 includes the method of example 42, wherein applying the CSD process includes shifting the HE-STF sequence by a first CSD value, the first CSD value larger than a second CSD value used to shift a data field sequence of the data stream.

Example 44 includes the method of example 42 or 43, further comprising: mapping the modulation symbols onto one transmission layer that is to be transmitted by a plurality of antennas; and using a per-antenna CSD process on the HE-STF symbols.

Example 45 includes the method of any one of examples 41-44, wherein the HE-STF symbols and HE-LTF symbols are in a first high-efficiency preamble; the CSD process is a first CSD process that uses a first cyclic shift value; and the method further comprises: using a second CSD process on the second high-efficiency preamble, the second CSD process to use a second cyclic shift value that is smaller than the first cyclic shift value.

Example 46 includes the method of example 45, further comprising receiving the first and second cyclic shift values from an access point.

Example 47 includes the method of any one of examples 41-46, wherein the CSD process is a first CSD process and the method includes using a second CSD process on data symbols of the modulation symbols.

Example 48 includes the method of any one of examples 41-46, wherein no CSD process is used on data symbols of the modulation symbols.

Example 49 includes the method of any one of examples 41-48, further comprising communicating with an access point using multiple-user multiple input multiple output (MIMO).

Example 50 includes a method comprising: receiving a data stream that includes high efficiency long training field (HE-LTF) sequence and data field sequence; estimating a first channel response for the data stream based on the HE-LTF sequence; multiplying the first channel response by a linear phase shift associated with the data field sequence to determine a second channel response; and decoding the data field sequence based on the second channel response.

Example 51 includes the method of example 50, wherein the HE-LTF sequence is transmitted without CSD.

Example 52 includes the method of example 50 or 51, wherein the data field sequence is transmitted with CSD.

Example 53 includes the method of any one of examples 50-52, wherein the linear phase shift includes cyclic shift diversity (CSD) phase shifts.

Example 54 includes the method of any one of examples 50-53, further comprising communicating with a plurality of stations using multiple-user multiple input multiple output (MIMO).

Example 55 includes an apparatus comprising means to perform any one of the methods of examples 34-54.

The description herein of illustrated implementations, including what is described in the Abstract, is not intended to be exhaustive or to limit the present disclosure to the precise forms disclosed. While specific implementations and examples are described herein for illustrative purposes, a variety of alternate and/or equivalent embodiments or implementations calculated to achieve the same purposes may be made in light of the above detailed description, without departing from the scope of the present disclosure, as those skilled in the relevant art will recognize.

What is claimed is:

1. An apparatus comprising:
media access control (MAC) layer circuitry to provide signal information; and
physical (PHY) layer circuitry coupled with the MAC layer circuitry to:
receive the signal information from the MAC layer circuitry;
process the signal information into a data stream to be transmitted by one or more antennas of a user equipment, the data stream to include a preamble with a high-efficiency short training field (HE-STF) sequence and a high-efficiency long training field (HE-LTF) sequence;
use a cyclic-shift diversity (CSD) process on the HE-STF sequence but not on the HE-LTF sequence; and
cause the data stream to be transmitted by the one or more antennas of the user equipment,
wherein the CSD process is a per-stream CSD process and the PHY layer circuitry is to shift the HE-STF sequence by a first CSD value, the first CSD value larger than a second CSD value used to shift a data field sequence of the data stream.

2. The apparatus of claim 1, wherein the data stream is to be transmitted by a plurality of antennas and the PHY layer circuitry is further to use a per-antenna CSD process on the HE-STF sequence.

3. The apparatus of claim 1, wherein the PHY layer circuitry does not use any CSD process on a data sequence of the data stream.

4. An apparatus comprising:
media access control (MAC) layer circuitry to provide signal information; and
physical (PHY) layer circuitry coupled with the MAC layer circuitry to:
receive the signal information from the MAC layer circuitry;
process the signal information into a data stream to be transmitted by one or more antennas of a user equipment, the data stream to include a preamble with a high-efficiency short training field (HE-STF) sequence and a high-efficiency long training field (HE-LTF) sequence;
use a cyclic-shift diversity (CSD) process on the HE-STF sequence but not on the HE-LTF sequence; and
cause the data stream to be transmitted by the one or more antennas of the user equipment,
wherein the preamble is a first high-efficiency preamble and the data stream further includes a second high-efficiency preamble, the CSD process is a first CSD process that uses a first cyclic shift value; and the PHY layer circuitry is further to:
use a second CSD process on the second high-efficiency preamble, the second CSD process to use a second cyclic shift value that is smaller than the first cyclic shift value.

5. An apparatus comprising:
media access control (MAC) layer circuitry to provide signal information; and
physical (PHY) layer circuitry coupled with the MAC layer circuitry to:
receive the signal information from the MAC layer circuitry;
process the signal information into a data stream to be transmitted by one or more antennas of a user equipment, the data stream to include a preamble with a high-efficiency short training field (HE-STF) sequence and a high-efficiency long training field (HE-LTF) sequence;
use a cyclic-shift diversity (CSD) process on the HE-STF sequence but not on the HE-LTF sequence; and
cause the data stream to be transmitted by the one or more antennas of the user equipment,
wherein the CSD process is a first CSD process and the PHY layer circuitry is to use a second CSD process on a data sequence of the data stream.

6. An apparatus comprising:
a layer mapper to map modulation symbols on to one or more transmission layers, the modulation symbols to include one or more high-efficiency short training field (HE-STF) symbols and one or more high-efficiency long training field (HE-LTF) symbols;
a precoder coupled with the layer mapper to receive the modulation symbols on the one or more transmission layers and to precode the modulation symbols to provide precoded modulation symbols, the precoder to include cyclic shift diversity (CSD) circuitry to apply a CSD process to the HE-STF symbols and to refrain from applying CSD to the HE-LTF symbols; and
one or more resource element (RE) mappers to receive the precoded modulation symbols and to map the precoded modulation symbols to resource elements for transmission via one or more antenna ports.

7. The apparatus of claim 6, wherein the CSD process is a per-stream CSD process.

8. The apparatus of claim 7, wherein the CSD circuitry is to shift an HE-STF sequence by a first CSD value, the first CSD value larger than a second CSD value used to shift a data field sequence of a data stream.

9. The apparatus of claim 7, wherein the layer mapper is to map the modulation symbols onto one transmission layer that is to be transmitted by a plurality of antennas and the CSD circuitry is further to use a per-antenna CSD process on the HE-STF symbols.

10. The apparatus of claim 6, wherein the HE-STF symbols are in a first high-efficiency preamble; the CSD process is a first CSD process that uses a first cyclic shift value; and the CSD circuitry is further to:
use a second CSD process on a second high-efficiency preamble, the second CSD process to use a second cyclic shift value that is smaller than the first cyclic shift value.

11. The apparatus of claim 10, wherein the apparatus is to receive the first and second cyclic shift values from an access point.

12. The apparatus of claim 6, wherein the CSD process is a first CSD process and the CSD circuitry is to use a second CSD process on data symbols of the modulation symbols.

13. The apparatus of claim 6, wherein the CSD circuitry does not use any CSD process on data symbols of the modulation symbols.

14. The apparatus of claim 6, wherein the apparatus is to communicate with an access point using multiple-user multiple input multiple output (MIMO).

* * * * *